United States Patent
Le Noc et al.

(10) Patent No.: US 8,171,801 B2
(45) Date of Patent: May 8, 2012

(54) MICRO-THERMISTOR GAS PRESSURE SENSOR

(75) Inventors: Loïc Le Noc, Québec (CA); Bruno Tremblay, Lévis (CA); Jean François Viens, Québec (CA)

(73) Assignee: Institut National D'Optique, Sainte-Foy, Quebec (CA)

( * ) Notice: Subject to any disclaimer, the term of this patent is extended or adjusted under 35 U.S.C. 154(b) by 712 days.

(21) Appl. No.: 12/340,220

(22) Filed: Dec. 19, 2008

(65) Prior Publication Data

US 2010/0154554 A1 Jun. 24, 2010

(51) Int. Cl.
*G01L 9/02* (2006.01)
*G01L 21/12* (2006.01)

(52) U.S. Cl. .......................................... 73/754; 73/755

(58) Field of Classification Search .................. 73/755, 73/753, 754; 257/417
See application file for complete search history.

(56) References Cited

U.S. PATENT DOCUMENTS

| | | | |
|---|---|---|---|
| 5,539,674 A | 7/1996 | Barbier et al. | |
| 6,474,172 B1 * | 11/2002 | Rolff et al. | 73/755 |
| 6,945,119 B2 | 9/2005 | Bills et al. | |
| 6,973,834 B1 | 12/2005 | Golan | |
| 7,087,451 B2 | 8/2006 | Arana et al. | |
| 7,241,998 B2 * | 7/2007 | Vilain | 250/338.1 |
| 7,278,322 B1 | 10/2007 | Lantz | |
| 7,322,248 B1 * | 1/2008 | Long et al. | 73/755 |
| 7,331,237 B2 | 2/2008 | Borenstein | |
| 2007/0069133 A1 | 3/2007 | DeWames et al. | |
| 2010/0154510 A1 * | 6/2010 | Viens et al. | 73/25.03 |

FOREIGN PATENT DOCUMENTS

| | | |
|---|---|---|
| CA | 2063661 | 4/1993 |
| CA | 2 330 626 | 4/1999 |
| EP | 1 795 875 A1 | 6/2007 |

OTHER PUBLICATIONS

S. N. Wang, K. Mizuno, M. Fujiyoshi, H. Funabashi, and J. Sakata, "Thermal micropressure sensor for pressure monitoring in a minute package," J. Vac. Sci. Technol. A 19(1), Jan./Feb. 2001, pp. 353-357.*

* cited by examiner

*Primary Examiner* — Lisa Caputo
*Assistant Examiner* — Punam Roy
(74) *Attorney, Agent, or Firm* — Merchant & Gould P.C.

(57) ABSTRACT

An apparatus and method precisely measure gas pressure over a large dynamic range and with good immunity to temperature fluctuations, encompassing applications such as gas sensing, bolometer imaging and industrial process monitoring. The micro-thermistor gas pressure sensor assembly includes a suspended platform micro-thermistor sensor device exposed to the gas pressure of a given atmospheric environment, an electrical readout circuit connected to the suspended platform micro-thermistor sensor device, wherein the suspended platform micro-thermistor sensor device acts as a variable electrical resistance in the readout electrical circuit, a binary-wave voltage source connected to the suspended platform micro-thermistor sensor device, and an ohmmeter.

16 Claims, 5 Drawing Sheets

MICRO-THERMISTOR GAS PRESSURE SENSOR

FIELD OF THE INVENTION

The present invention relates to a micro-thermistor gas pressure sensor.

BACKGROUND OF THE INVENTION

A conventional gas pressure sensor, such as a Pirani gauge, is calibrated against several known pressures to determine a relationship between ambient pressure and power dissipated by the sensor. On one hand, since a Pirani gauge may be designed to have a wide dynamic range and be relatively simple and inexpensive, there is a need to be able to use this type of pressure gauge as a substitute for much higher priced gauges such as capacitance manometers and ionization gauges. On a second hand, the growing markets of high-performance wafer-level micro-packaging require miniaturization of the gas pressure sensors and integration to standard CMOS processes and MEMS micro-devices such as bolometers, gyroscopes and accelerometers.

US 2007/0069133 A1 relates to a gas pressure sensor combining Pirani-like functionality and MEMS integration. Pressure sensors based on MEMS micro-sensor devices can achieve both low-cost and CMOS-compatible integration. However, existing MEMS micro-sensor devices may show inaccurate pressure readings when subjected to temperature fluctuations, especially at low pressures. US 2007/0069133 A1 exhibits such temperature sensitivity, because the electrical response of the sensor depends on the substrate and environment temperatures by virtue of the temperature dependency of the variable resistance. Furthermore, the method for pressure measurement relies on an absolute voltage reading instead of differential voltage readings, wherein absolute voltage reading may be subjected to inaccuracies if fabrication errors occur from one sensor to the other.

Gas pressure micro-sensors showing relative immunity to temperature fluctuations have been developed. U.S. Pat. No. 6,945,119 B2 and U.S. Pat. No. 7,331,237 B2 relate to temperature-compensated micro-sensors integrated in a CMOS circuit. Temperature fluctuation compensation is achieved using a combination of temperature-sensitive and temperature-insensitive elements coupled to a bridge readout circuit. However, temperature compensation of these gas pressure sensors is achieved at the cost of structural complexity of the device and readout circuit, which impede integration of such sensors into MEMS micro-devices. Furthermore, the method for pressure measurement relies on an absolute voltage reading instead of differential voltage readings which lead to inaccuracies if fabrication errors occur from one gauge to the other.

It is the object of the present invention to provide an apparatus and method allowing 1) miniaturization of the wide-dynamic-range pressure sensors to address the high-performance micro-packaging markets and 2) integration to standard CMOS processes and MEMS micro-devices such as bolometers, gyroscopes and accelerometers, and 3) relative immunity of the pressure sensors to temperature fluctuations and fabrication errors by the use of differential voltage readings.

SUMMARY OF THE INVENTION

The invention presents an apparatus and method for precisely measuring gas pressure in atmospheric environments as small as 1 picoliter. The micro-thermistor gas pressure sensor and method of operation described herein provides gas pressure measurements over a large dynamic range and with good immunity to temperature fluctuations. The micro-thermistor gas pressure sensor is compatible with standard CMOS fabrication processes and readout circuits.

The gas pressure sensing element of the present invention includes a suspended platform micro-thermistor device, which is a suspended electrical transducer that changes electrical resistance with a change of temperature. The gas pressure sensor assembly comprises the suspended platform micro-thermistor device and a readout electrical circuit driving the micro-thermistor device. When the micro-thermistor is electrically excited and heated, its temperature at equilibrium is a function of applied electrical power and of thermal transfer to the environment. The gas is part of this environment and the heat transferred from the micro-thermistor device to the environment is a function of the gas pressure. The principle of gas pressure measurement consists in heating the micro-thermistor device with a binary-wave electrical excitation, measuring its thermal conduction to the environment, and determining the gas pressure from the measured thermal conduction. Specifically, the method consists in measuring the ohmic responsivity of the suspended platform micro-thermistor with a binary-wave electrical excitation. The ohmic responsivity is a direct measurement of the thermal conductivity of the suspended platform micro-thermistor sensor device, the latter being related to gas pressure.

Thus, in accordance with an aspect of the invention, there is provided a gas pressure sensor assembly comprising:
- at least one suspended platform micro-thermistor sensor device exposed to the gas pressure of a given atmospheric environment, said sensor device being at least partially encased in a gas pressure environment;
- an electrical readout circuit connected to said suspended platform micro-thermistor sensor device, wherein said suspended platform micro-thermistor sensor device acts as a variable electrical resistance in said electrical readout circuit;
- a binary-wave voltage source connected to said suspended platform micro-thermistor sensor device; and
- an ohmmeter.

In accordance with another aspect of the invention, there is provided a method for gas pressure measurement consisting of:
- electrically exciting a suspended platform micro-thermistor sensor device with a binary-wave voltage source signal;
- measuring the ohmic responsivity of said suspended platform micro-thermistor sensor device using an ohmmeter, wherein said ohmmeter has an electrical response proportional to said ohmic responsivity; and
- determining gas pressure from said ohmic responsivity.

These and other features and advantages of the invention will be apparent to those skilled in the art from the following detailed description of preferred embodiments, taken together with the accompanying drawings.

DETAILED DESCRIPTION OF THE INVENTION

This invention presents an apparatus and method for measuring gas pressure in atmospheric environments as small as 1 picoliter, with pressure measurements performed over a large dynamic range and with good immunity to temperature fluctuations. The apparatus and method of the present invention are compatible with digital and analog readout circuits and CMOS fabrication processes.

Figure 1:
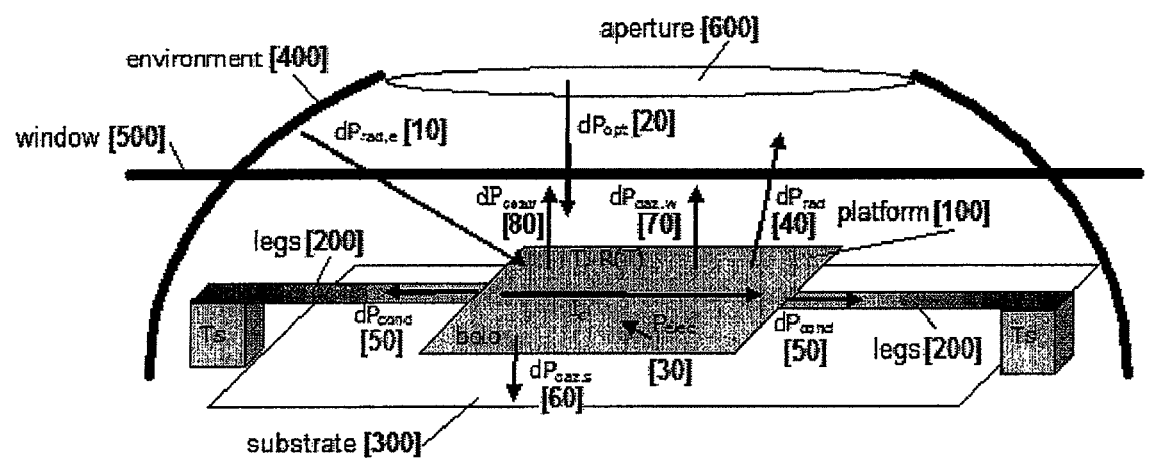
FIG. 1. is a schematic representation of the micro-thermistor gas pressure sensing element and its surroundings, including the heat budget of the system.

FIG. 1 is a schematic representation of the apparatus. The gas pressure sensing element consists of a micro-thermistor device comprising a suspended platform [100] and suspending legs [200] connecting the suspended platform to a substrate [300]. The micro-thermistor suspended platform [100] may have a width between 0.1 μm and 250 μm, a length between 0.1 μm and 250 μm, and a thickness between 0.1 μm and 5 μm. The suspending legs [200] must provide enough mechanical rigidity for suspending the micro-thermistor platform [100] at least 0.1 μm above the substrate [300] and must provide a path for electrical connection from the suspended platform [100] to the substrate [300]. Standard CMOS fabrication processes can be used to fabricate the suspended platform micro-thermistor device on the substrate. The suspending legs [200] may be made of silicon nitride or silicon dioxide materials or any other materials procuring mechanical rigidity, coated with a metallic layer to procure electrical conductivity, and have a length between 1 μm and 1000 μm. The suspending legs [200] usually have smaller widths than the suspended platform [100] in order to procure thermal isolation between the suspended platform and the substrate [300]. The substrate [300] may consist of a silicon wafer or a CMOS electrical readout circuit or any CMOS integrated device. The substrate is partly or fully enclosed within a gas pressure environment [400] which may include a window [500] (e.g. infrared window or diaphragm or mask) for shielding the suspended platform [100] from excess infrared radiation coming from the environment [400], and may include an optical aperture [600] for providing the suspended platform [100] infrared radiation from a scene. The environment [400] must be large enough to entirely encapsulate the micro-thermistor suspended platform [100] and suspending legs [200]. Since the micro-thermistor suspended platform [100] and suspending legs [200] have micrometer-scale dimensions, the environment [400] encompassing the micro-thermistor device may have a volume as small as 1 picoliter ($10^{-15}$ m³). The environment [400] is filled with a gas that exerts pressure equally everywhere in the environment, including the top and bottom surfaces of the suspended platform [100]. The gas may be composed of air, oxygen, nitrogen, noble gas or any other gases including a mixture of several different gases.

The temperature of the micro-thermistor suspended platform [100] is a function of applied heating power and thermal transfers to the substrate and to the environment. FIG. 1 shows the total heat budget of the system defined as the thermal transfers between the suspended platform [100] of the micro-thermistor and the substrate [300] and environment [400]. Specifically, the micro-thermistor suspended platform [100] receives heat from a plurality of sources:

$P_{rad,e}$, by absorbing infrared radiation emitted by the environment [10].

$P_{opt}$, by absorbing infrared radiation coming from the scene through the window [20]

$P_{elec}$, by Joule heating when an electrical current is applied from the legs through the micro-thermistor suspended platform [30].

And the micro-thermistor suspended platform [100] dissipates heat to a plurality of thermal conduction paths:

$P_{rad}$, by thermal radiation [40]

$P_{cond}$, by thermal conduction to the substrate through the legs [50]

$P_{gaz,s}$, by thermal conduction to the substrate through the gas [60]

$P_{gaz,w}$, by thermal conduction to the window through the gas [70]

$P_{conv}$, by thermal convection to the window through the gas [80]

The dynamic analysis of the system is based on the use of heat transfer equation for the suspended platform [100] of the micro-thermistor. Taking into consideration the thermodynamic interactions between the micro-thermistor and its surroundings, it is well known in the art of thermal conduction that the following heat equation can be derived:

$$C\frac{d(\Delta T)}{dt} + G(\Delta T) = P$$

Where C is the thermal capacity of the suspended platform [100] of the micro-thermistor (in units of J/K), G its thermal conduction (in units of W/K) related to all the thermal dissipation mechanisms of the system [40] [50] [60] [70] [80], ΔT the incremental temperature change of the suspended platform [100] of the micro-thermistor with respect to the substrate [300] ($\Delta T = T_b - T_s$) (in units of K) and P is the power [10] incident [20] on the micro-thermistor or applied [30] to the micro-thermistor expressed in Watts. The main component of the power P, the applied electrical excitation $P_{elec}$ [30], is related to the electrical resistance of the suspended platform [100] of the micro-thermistor $R_b$, the electrical potential $V_b$ across the legs [200] of the micro-thermistor, and the electrical current $i_b$ passing through the suspended platform [100] of the micro-thermistor.

The micro-thermistor suspended platform [100] may comprise a combination of silicon dioxide and silicon nitride thin films for procuring mechanical rigidity to the platform; a metallic thin film for procuring electrical conductivity to the platform; and a thermally sensitive thin film material for procuring change of electrical properties with a change of temperature of the platform. The thermally sensitive thin film material may consist of vanadium oxide, titanium oxide or amorphous silicon.

Vanadium oxide (such as $VO_x$ with 1<x<3) has received most attention as a micro-thermistor thermally sensitive thin film material because of the large temperature coefficient of resistance (TCR) of about 2% per Kelvin near 20° C. The properties of vanadium oxide films are dependent of the microstructure and crystallinity. These can be controlled by the experimental process parameters, such as the molecular precursors, heat treatments and controlled atmosphere. Other thermally sensitive thin film materials can be used for the micro-thermistor suspended platform [100] in order to procure change of electrical properties of the micro-thermistor with a change of temperature of the platform, ideally with a temperature coefficient of resistance (TCR) of at least 0.5% per Kelvin. The thermally sensitive thin film material is not limited to a specific material composition; it may consist of vanadium oxide, titanium oxide, amorphous silicon or any material or alloy with a temperature coefficient of resistance (TCR) of at least 0.5% per Kelvin.

The coefficient of thermal conduction G between the suspended platform [100] of the micro-thermistor and its surroundings [300] [400] can be described by the contribution of all the thermal dissipation mechanisms of the system [40] [50] [60] [70] [80]:

$$G = G_{leg} + G_{rad} + G_{gas} + G_{conv}$$

where $G_{leg}$ is the coefficient of thermal conduction between the micro-thermistor suspended platform [100] and the substrate [300] through the micro-thermistor legs which determines the heat dissipation through the legs [50]; $G_{rad}$ is the coefficient of thermal conduction between the micro-thermistor suspended platform [100] and the environment [400] by emitted infrared radiation which determines the heat dissipation through radiation [40]; $G_{gas}$ is the coefficient of thermal conduction between the micro-thermistor suspended platform [100] and its surroundings through the gas, which comprises heat dissipation to the substrate [300] through the gas [60] and heat dissipation to the environment [400] through the gas [70]; and $G_{conv}$ is the coefficient of thermal conduction between the micro-thermistor suspended platform [100] and its surroundings by gas convection [80].

Leg Conduction:

The coefficient of thermal conduction $G_{leg}$ between the micro-thermistor suspended platform [100] and the substrate [300] through the legs [200] depends on the leg length, leg cross-section and leg material. In practice, the coefficient of thermal conduction $G_{leg}$ is not always known precisely and may depend on temperature, and the gas pressure measurement method herein described in this invention cancels the need for precise knowledge of this term of the equation. Typically, the coefficient of thermal conduction to the substrate through the legs is $10^{-6}$ W/K or less.

Radiation:

The coefficient of thermal conduction Grad by emitted infrared radiation from the micro-thermistor suspended platform [100] and its surroundings [300] [400] depends on the surface area of the suspended platform [100] and on its spectral emissivity which could be a blackbody or non-blackbody function of temperature. For an ideal blackbody material, this coefficient of thermal conduction can be approximated as the sum of radiated power from the micro-thermistor bottom surface facing the substrate [300] and from the micro-thermistor top surface facing the environment [400]:

$$G_{rad} = \sigma \epsilon \beta A (T_b^4 - T_s^4)/(T_b - T_s) + \sigma \epsilon \beta A (T_b^4 - T_{env}^4)/(T_b - T_s) \simeq 4 \sigma \epsilon \beta A (T_s^3 + T_{env}^3)$$

where $\sigma$ is the Stefan-Boltzmann constant, $\epsilon$ is the effective emissivity of the micro-thermistor suspended platform [100], A is its surface area, $\beta$ is a form factor that includes thermal dissipation through other parts of the micro-thermistor structure, $T_b$ is the micro-thermistor temperature, $T_s$ is the substrate temperature and $T_{env}$ is an effective environment temperature related to the hemispheric distribution of all thermal components of the environment seen by the micro-thermistor platform [100]. The right-hand side of the equation assumes that the temperature difference between the micro-thermistor and the substrate is small with respect to the absolute temperature of the micro-thermistor ($|T_b - T_s| \ll T_b$) which is valid to 1% error when the micro-thermistor is heated only by a few degrees Kelvin. In practice, the spectral emissivity $\epsilon$ of the platform and the temperatures ($T_b$, $T_s$, $T_{env}$) are not always known precisely, and consequently the coefficient of thermal conduction Grad is not always known precisely. The gas pressure measurement method herein described in this invention cancels the need for precise knowledge of these terms of the equation.

Gas Conduction:

The coefficient of thermal conduction Ggas between the micro-thermistor suspended platform [100] and its surroundings through the gas, which comprises heat dissipation to the substrate [300] through the gas [60] and heat dissipation to the environment [400] through the gas [70], can be obtained by the kinetic theory of gases for the heat conduction in a gas between two parallel plates;

$$G_{gas} = \frac{\beta \cdot A}{\frac{d_s}{\lambda_{gas_s}} + \frac{1}{\gamma_{gas} \cdot p}} + \frac{k \cdot \beta \cdot A}{\frac{d_e}{\lambda_{gas_e}} + \frac{1}{\gamma_{gas} \cdot p}}$$

Where p is the gas pressure, $d_s$ the distance between the micro-thermistor suspended platform [100] and the substrate [300], $d_e$ the distance between the micro-thermistor suspended platform [100] and the window [500], A is the surface area of the micro-thermistor suspended platform [100], $\beta$ is a form factor that includes thermal dissipation through other parts of the micro-thermistor structure, and $k = (T_b - T_{env})/(T_b - T_s)$. In the absence of window [500], $d_e$ can be defined as an effective distance between the micro-thermistor suspended platform [100] and the environment [400]. $\lambda_{gas}$ is the thermal conductivity of the gas in the high-pressure regime and $\gamma_{gas}$ is the thermal conductivity per unit pressure and length in the low-pressure regime. The gas conductivity $\lambda_{gas}$ depends on the gas temperature:

$$\lambda_{gas} = \lambda_o + (d\lambda/dT_s) \cdot (T_g - T_o)$$

Where $T_g$ is an effective gas temperature given by $T_g = (1 - \eta) T_x + \eta T_b$, where $T_x = T_s$ (substrate side) or $T_x = T_{env}$ (environment side) and $\eta$ is a thermal distribution factor; typically $\eta \sim 0.5$. For air: $d\lambda/dT = 7.2167e-005$ W/mK$^2$ and $\lambda_o = 0.0243$ W/mK at $T_o = 273$K. Other gases may show different coefficients. In practice, the gas conductivities ($\lambda_{gas}$, $\gamma_{gas}$, $\eta$), the temperatures ($T_b$, $T_s$, $T_{env}$), and the dimensional terms ($d_s$, $d_e$, $\beta$ are not always known precisely, and the gas pressure measurement method herein described in this invention cancels the need for precise knowledge of these terms of the equation.

Convection:

The heat transferred by free convection [80] from the micro-thermistor suspended platform [100] into the gas to the environment [400] at the temperature $T_{env}$ is given by $$P_{conv} = G_{conv} \cdot \Delta T = Ah(T_b - T_{env})$$

Where h is the convection coefficient of the gas [in air h=5 W/m$^2$K]. In practice, the convection coefficient h is not always known precisely, and the gas pressure measurement method herein described in this invention cancels the need for precise knowledge of this term of the equation. For most cases encompassed within this invention, the thermal conduction $G_{conv}$ by free air convection through gas movement is negligible compared to the thermal conduction $G_{gas}$ through the gas.

The thermal conduction G between the suspended platform [100] of the micro-thermistor and its surroundings [300]

[400] can also be described by the contribution from additional factors herein not mentioned, dependent on the micro-thermistor three-dimensional design and fabrication. In practice, these additional factors are not always known precisely, and the gas pressure measurement method herein described in this invention cancels the need for precise knowledge of these terms of the equation.

This invention thus relates to a microscopic thermistor apparatus for measuring gas pressure in atmospheric environments with volumes as small as 1 picoliter. The gas pressure sensing element consists of a suspended platform micro-thermistor device which is a transducer that changes electrical resistance with a change of temperature. The gas pressure sensor assembly comprises the suspended platform micro-thermistor device [100] and a readout circuit connected to the suspended platform for driving the micro-thermistor device electrically. When the micro-thermistor is electrically excited and heated, its temperature at equilibrium is a function of incident radiative power [10] [20] and applied electrical power [30], and of thermal transfer to the environment including all the heat dissipation mechanisms described above [40] [50] [60] [70] and [80]. Since the gas is part of this environment, and since the heat transferred from the micro-thermistor suspended platform [100] to the environment [400] and substrate [300] depends on gas pressure [60] [70], the micro-thermistor apparatus can be used as a microscopic gas pressure sensing device.

Gas Pressure Measurement Method:

The suspended platform of the micro-thermistor [100] is electrically excited by voltage source connected to it. Since the micro-thermistor device is electrically resistive, it is well known in the art that this electrical excitation procures heating to the micro-thermistor by virtue of the Joule effect. The temperature of the micro-thermistor at equilibrium is a function of applied electrical power [30] and of thermal transfer to the substrate [300] and to the environment [400] via the plurality of thermal dissipation mechanisms previously described [10] [20] [40] [50] [60] [70] and of the environment [400] and the heat transferred from the micro-thermistor device to the environment [60] [70] is a function of the gas pressure exerted within the environment. The principle of gas pressure measurement thus consists of heating the suspended platform micro-thermistor device [100] by Joule heating [30] and of measuring the thermal conductivity of the micro-thermistor device to its surroundings, and determining the gas pressure from the measured thermal conduction.

The micro-thermistor gas sensor of the present invention is highly sensitive to the radiative thermal conduction $G_{rad}$ and to the leg thermal conduction $G_{leg}$. The influence of radiation conduction and leg conduction on the micro-thermistor suspended platform [100] must be considered in the proposed method of gas pressure measurement in order to prevent large errors of measurements to occur, since the power absorbed [10] [20] and dissipated [40] [50] by radiation and by leg conduction is of the same order of magnitude as the power dissipated through the gas [60] [70] [80]. To improve sensor tolerance against radiation conduction and leg conduction it is proposed to perform a double measurement at two fixed micro-thermistor temperatures. This double-measurement method herein described in this invention cancels the need for precise knowledge of the radiation term $G_{rad}$, of the conduction through the legs $G_{leg}$, of convection through the gas $G_{conv}$ and of any additional thermal conduction factors herein not mentioned, since these factors are not always known precisely in practice.

Specifically, the method of measuring gas pressure with the suspended platform micro-thermistor assembly of the present invention is based on probing the thermal response of the micro-thermistor device with a binary-wave electrical excitation [30]. The binary-wave electrical excitation may consist of a step-function voltage signal with a minimum voltage ($V_1$) followed by a maximum voltage ($V_2$), the difference between the minimum and maximum voltages corresponds to the amplitude of the binary-wave signal, $\Delta V=V_2-V_1$. The voltage $V_b$ applied to the micro-thermistor depends on the electrical excitation V and on the transfer function f of the readout circuit, $V_b=fV$. The binary-wave signal generates an incremental amount of electrical heating power [30] applied to the micro-thermistor suspended platform [100], $dP_b=V_{b2}^2/R_{b2}-V_{b1}^2/R_{b1}$, leading to an incremental change of micro-thermistor electrical resistance, $dR_b=R_{b2}-R_{b1}$, where $R_{b1}$ and $R_{b2}$ are the electrical resistances of the micro-thermistor suspended platform at temperatures $T_{b1}$ and $T_{b2}$ respectively. Experimentally, the resistance of the micro-thermistor $R_b$ is used instead of the temperature $T_b$; the temperature cannot be measured experimentally but the temperature is completely determined by the electrical resistance of the micro-thermistor by virtue of its temperature coefficient of resistance (TCR). Generally, both $T_{b1}$ and $T_{b2}$ are a few degrees above substrate/environment temperatures $T_s$ and $T_{env}$, and the difference between $T_{b1}$ and $T_{b2}$ is a few degrees Kelvin.

Alternatively, the binary-wave electrical excitation may consist of a periodic square-wave voltage signal with minimum voltages ($V_1$) followed periodically by maximum voltages ($V_2$) with a frequency ω, the difference between the minimum and maximum voltages corresponds to the amplitude of the periodic binary-wave signal, $\Delta V=V_2-V_1$, and to an incremental amount of electrical heating power per period of the binary-wave, $dP_b=V_{b2}^2/R_{b2}-V_{b1}^2/R_{b1}$, and to an incremental change of micro-thermistor electrical resistance, $dR_b=R_{b2}-R_{b1}$. The gas pressure measurement method consists of measuring the ohmic responsivity $dR_b/dP_b$ of the micro-thermistor device in response to the binary-wave electrical excitation; the ohmic responsivity is a direct measurement of the thermal conductivity of the suspended platform micro-thermistor device, the later being related to gas pressure as described previously.

Taking into account the thermodynamic interactions between the micro-thermistor and its surroundings, comprising all the thermal dissipation mechanisms [40] [50] [60] [70] [80] previously described, the following heat equation can be derived:

$$C\frac{d(\Delta T)}{dt} + G(\Delta T) = P$$

Where C is the thermal capacity of the micro-thermistor platform [100], G its coefficient of thermal conduction comprising every heat dissipation mechanisms previously defined, and ΔT the temperature change of the micro-thermistor suspended platform [100] with respect to the substrate [300]: $\Delta T=T_b-T_s$. The right hand side of the equation represents the power applied to the micro-thermistor suspended platform which may consist principally of the binary-wave electrical excitation supplying an incremental amount of electrical heating power to the micro-thermistor [30], $P=P_b$. As seen previously, the coefficient of thermal conduction G depends on several factors, including the micro-thermistor temperature $T_b$, and may take the form $G=G(T_b)$. Steady-state is achieved after a time period of t≫C/G, typically 100 msec or more, from which d/dt tends to zero. At steady-state, and to first order, the solution for the thermal conductivity takes the form, $$G + \frac{dG}{dT_b}(T_b - T_s) = \frac{P_b}{(T_b - T_s)}$$

Where $P_b$ is defined as the electrical heating power needed to bring the micro-thermistor platform from the temperature $T_s$ to the temperature $T_b$. The same relation applies to the difference of electrical heating power between two measurements made at temperatures $T_{b1}$ and $T_{b2}$, $$G + \frac{dG}{dT_b}(T_b - T_s) = \frac{(P_{b2} - P_{b1})}{(T_{b2} - T_{b1})} = \frac{dP_b}{dT_b}$$

Since the micro-thermistor electrical resistance is function of temperature, by virtue of its non-zero Temperature Coefficient of Resistance, $\alpha = (dR_b/dT_b)/R_b$, the solution on thermal conductivity can be expressed by:

$$G_{leg} + G_{radiation} + G_{gas} + G_{conv} + \frac{dG}{dT_b}(T_b - T_s) = \alpha R_b \frac{dP_b}{dR_b} = \frac{\alpha R_b}{\Omega}$$

Where $\alpha$ is the temperature coefficient of resistance (TCR) of the micro-thermistor and $R_b$ its electrical resistance at the reference temperature $T_s$. The term $\Omega = dR_b/dP_b$ is the ohmic responsivity of the micro-thermistor suspended platform. The ohmic responsivity $\Omega$ of the micro-thermistor suspended platform can be measured since it is related to the experimentally measurable parameters of the micro-thermistor $P_{b1}$, $P_{b2}$, $R_{b1}$, $R_{b2}$, $V_{b1}$, and $V_{b2}$:

$$\frac{\alpha R_b}{\Omega} = \frac{(P_{b2} - P_{b1})}{(T_{b2} - T_{b1})} = \alpha R_b \frac{(P_{b2} - P_{b1})}{(R_{b2} - R_{b1})} = \alpha R_b \frac{\left(\frac{V_{b2}^2}{R_{b2}} - \frac{V_{b1}^2}{R_{b1}}\right)}{(R_{b2} - R_{b1})}$$

Since the micro-thermistor acts as a variable electrical resistance in the electrical circuit due to its non-zero temperature coefficient of resistance, the ohmic responsivity $\Omega$ represents the differential relation of the change of electrical resistance $dR_b = R_{b2} - R_{b1}$ of the micro-thermistor platform in response to an incremental change of heating power $dP_b = P_{b2} - P_{b1}$. In the present invention, it is desirable to have as large a temperature coefficient of resistance as possible for the micro-thermistor thermally sensitive thin film material in order to magnify the change of micro-thermistor electrical resistance in response to a change of heating power, and therefore improve device sensitivity. Ideally, the temperature coefficient of resistance should be larger than 0.5% per Kelvin ($\alpha > 0.005$).

As set forth in the above equation, the ohmic responsivity $\Omega$ of the micro-thermistor can be determined by a measurement of the incremental change of heating power ($dP_b = P_{b2} - P_{b1}$), and/or a measurement of the incremental change of temperature ($dT_b = T_{b2} - T_{b1}$), and/or a measurement of the incremental change of electrical resistance ($dR_b = R_{b2} - R_{b1}$), and/or a measurement of the incremental change of applied voltage ($dV_b = V_{b2} - V_{b1}$). Full temperature compensation for the gas pressure measurement method herein described can be obtained by keeping the incremental change of temperature ($dT_b = T_{b2} - T_{b1}$) constant during the measurements.

To cancel the temperature-dependency of the unknown power absorbed [10] [20] and dissipated [40] [50] [80] by the micro-thermistor platform [100], which depends mostly on the micro-thermistor temperature $T_b$, and to cancel the need for precise knowledge of the parameters ($\lambda_{gas}$, $\gamma_{gas}$, $\eta$, $T_s$, $T_{env}$, $\epsilon$, $d_s$, $d_e$, $\beta$, $\eta$) of the system, it is sufficient to realize two measurements always at the same micro-thermistor temperatures ($T_{b1}$, $T_{b2}$) and to consider the difference of applied power $dP_b$ [30] at those same two micro-thermistor temperatures. Assuming that the temperatures ($T_{b1}$, $T_{b2}$, $T_s$, $T_{env}$) and gas composition are kept constant during the two measurements, the conductivity terms $G_{leg}$, $G_{rad}$, and $G_{conv}$ will be kept constant. The ohmic responsivity $\Omega$ will then be a function of pressure p only by virtue of the gas conductivity term $G_{gas} = G_{gas}(p)$:

$$\frac{\alpha R_b}{\Omega} = G_{leg} + G_{radiation} + G_{gas} + G_{conv} + \frac{dG}{dT_b}(T_b - T_s) = G_{gas} + \text{constant}$$

In this invention the preferred heating method consists of heating the micro-thermistor device with a binary-wave electrical excitation supplying an incremental amount of electrical heating power $dP_b$ [30] to the micro-thermistor [100]. The binary-wave electrical excitation consists of a step-function voltage signal with a minimum voltage ($V_1$) followed by a maximum voltage ($V_2$), the difference between the minimum and maximum voltages corresponds to the amplitude of the binary-wave signal, $\Delta V = V_2 - V_1$. The voltage $V_b$ applied to the micro-thermistor depends on the electrical excitation V and on the transfer function f of the readout circuit, $V_b = fV$. The binary-wave signal generates an incremental amount of electrical heating power [30] applied to the micro-thermistor suspended platform [100], $dP_b = V_{b2}^2/R_{b2} - V_{b1}^2/R_{b1}$, leading to an incremental change of micro-thermistor electrical resistance, $dR_b = R_{b2} - R_{b1}$, where $R_{b1}$ and $R_{b2}$ are the electrical resistances of the micro-thermistor suspended platform at temperatures $T_{b1}$ and $T_{b2}$ respectively, and $V_{b1}$ and $V_{b2}$ are the voltages at the micro-thermistor when the voltage source [120] is at $V_1$ and $V_2$, respectively. By virtue of the relation between electrical resistance and temperature of the micro-thermistor, given by the temperature coefficient of resistance (TCR), the minimum voltage ($V_1$) of the binary-wave electrical excitation is adjusted so that the micro-thermistor resistance is at a predetermined value $R_{b1}$ and the maximum voltage ($V_2$) of the binary-wave electrical excitation is adjusted so that the micro-thermistor resistance is at a predetermined value $R_{b2}$. The values of ($R_{b1}$, $R_{b2}$, $dR_b$, $T_{b1}$, $T_{b2}$) are thus constant and the measurements of ($P_{b1}$, $P_{b2}$, $V_{b1}$, $V_{b2}$) are done always at the same micro-thermistor temperatures $T_b$. The ohmic responsivity $\Omega$ of the suspended platform micro-thermistor can therefore be determined from $\Omega = dR_b/dP_b$ with minimization of the temperature dependencies of [10], [20], [40] [50] and [80].

Since the ohmic responsivity $\Omega$ of the suspended platform micro-thermistor is related to the thermal conductivity G of the micro-thermistor, and therefore to gas pressure p within the environment as mentioned previously, a measurement of ohmic responsivity will provide a measurement of gas pressure. The measurements must be made at thermal steady-state; since thermal steady-state is achieved typically after 10 msec or more the frequency $\omega$ of the binary-wave voltage source [120] must be below 100 Hertz for thermal steady-state to occur during the measurements.

The method for gas pressure measurement of the present invention thus consists in electrically exciting a suspended platform micro-thermistor sensor device with a binary-wave voltage source signal; and measuring the ohmic responsivity of the said suspended platform micro-thermistor sensor device; and determining gas pressure from said ohmic responsivity.

Figure 2:
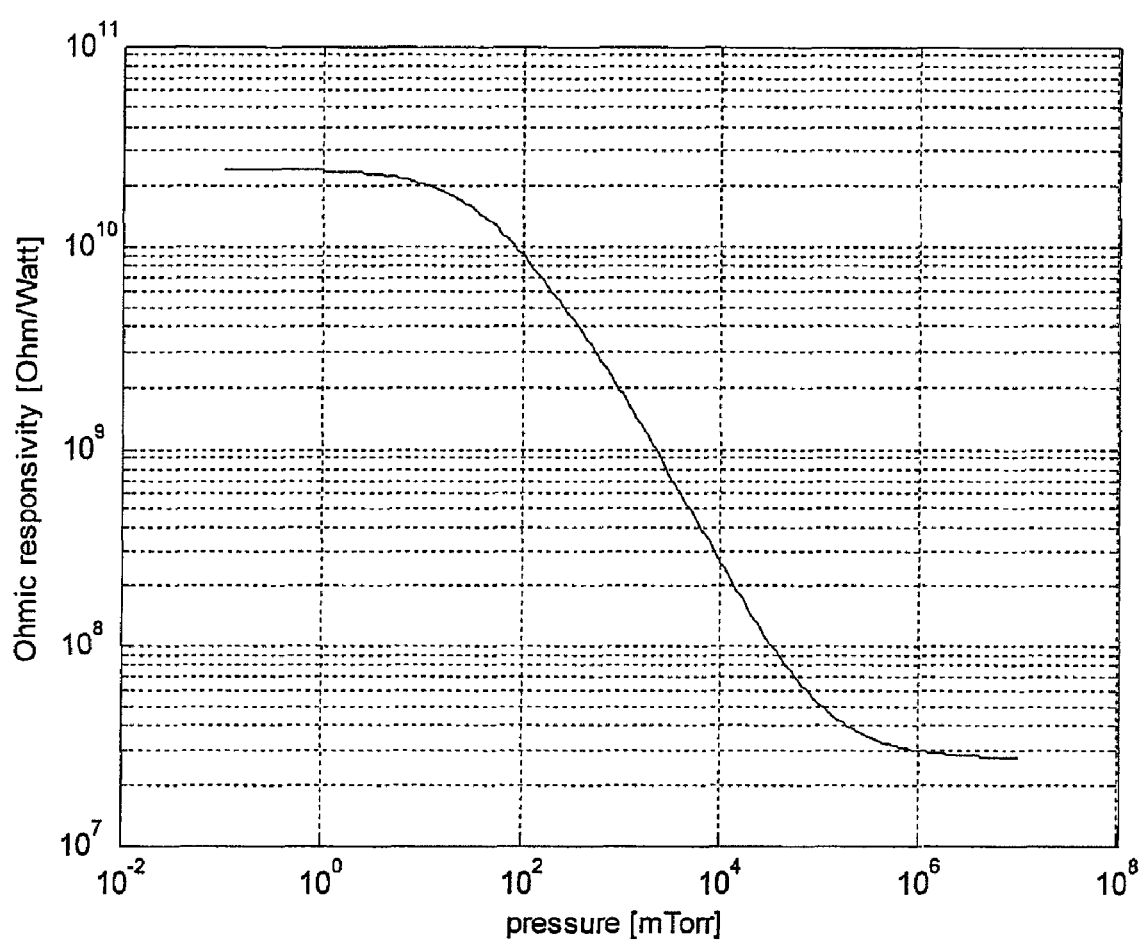
FIG. 2. is a chart showing ohmic responsivity $\Omega$ as function of air pressure p, for a 70×70 $\mu m^2$ micro-thermistor gas pressure sensor.

FIG. 2 plots the relation between ohmic responsivity $\Omega$ and air pressure p for an exemplary micro-thermistor device. It can be seen that the ohmic responsivity varies as function of pressure in the range of air pressures between $10^{-4}$ Torr to $10^4$ Torr, thus providing gas pressure sensing capability over a wide dynamic range. Since the gas pressure sensing capability of the micro-thermistor gas pressure sensor extends from $10^{-4}$ Torr to $10^4$ Torr, the micro-thermistor gas pressure sensor can be used to monitor the pressure of a gas below and above atmospheric pressure. The sensor is not constrained to sensing gas pressure inside vacuum environments or packages. By a proper design of the distance $d_s$ between the micro-thermistor platform [100] and the substrate [300], of the distance $d_e$ between the micro-thermistor platform [100] and the window [500], of the surface area A and emissivity $\epsilon$ of the micro-thermistor platform [100], of the length of the suspending legs [200], and of the micro-thermistor temperature $T_b$, etc., the gas pressure sensing capability of the micro-thermistor gas sensor can be tuned below $10^{-4}$ Torr or above $10^4$ Torr. Low pressure sensing capability can be achieved, for example, by increasing the surface area A and decreasing the emissivity $\epsilon$ of the platform [100] and by increasing the length of the suspending legs [200]. High pressure sensing capability can be achieved, for example, by decreasing the distances $d_s$ and $d_e$ between the micro-thermistor platform [100] and the substrate [300] and window [500]. Gas pressure sensing tuning capabilities of the micro-thermistor gas sensor are not limited to these specific parameter changes.

Several micro-thermistor suspended platforms, with different physical characteristics such as the ones just mentioned, may be combined within a single readout circuit to provide sensing capability over a wider dynamic range than a single micro-thermistor suspended platform. For example, several micro-thermistor suspended platforms may be combined and tuned for measuring gas pressure at low pressure regimes, while several other micro-thermistor suspended platforms may be combined in the same readout circuit and tuned for measuring gas pressure at high pressure regimes; the plurality of micro-thermistor suspended platforms thus combined to provide sensing capability over an overall wider dynamic range. The plurality of micro-thermistor suspended platforms may be combined in series or in parallel with respect to the voltage source [120] along with load resistances, or load inductances, or load capacitances, or a combination thereof comprised in the same readout circuit [101].

Figure 3:
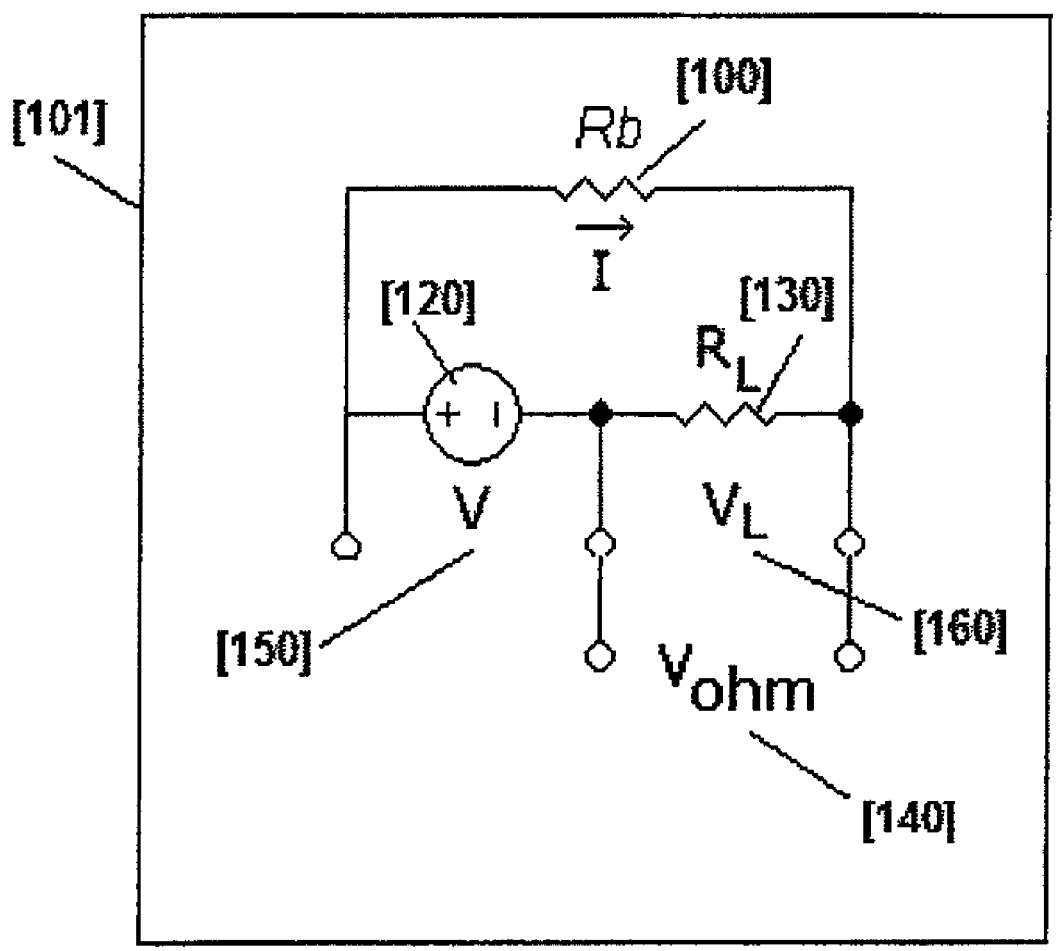
FIG. 3. shows an exemplary embodiment of the gas pressure sensor assembly.
Figure 4:
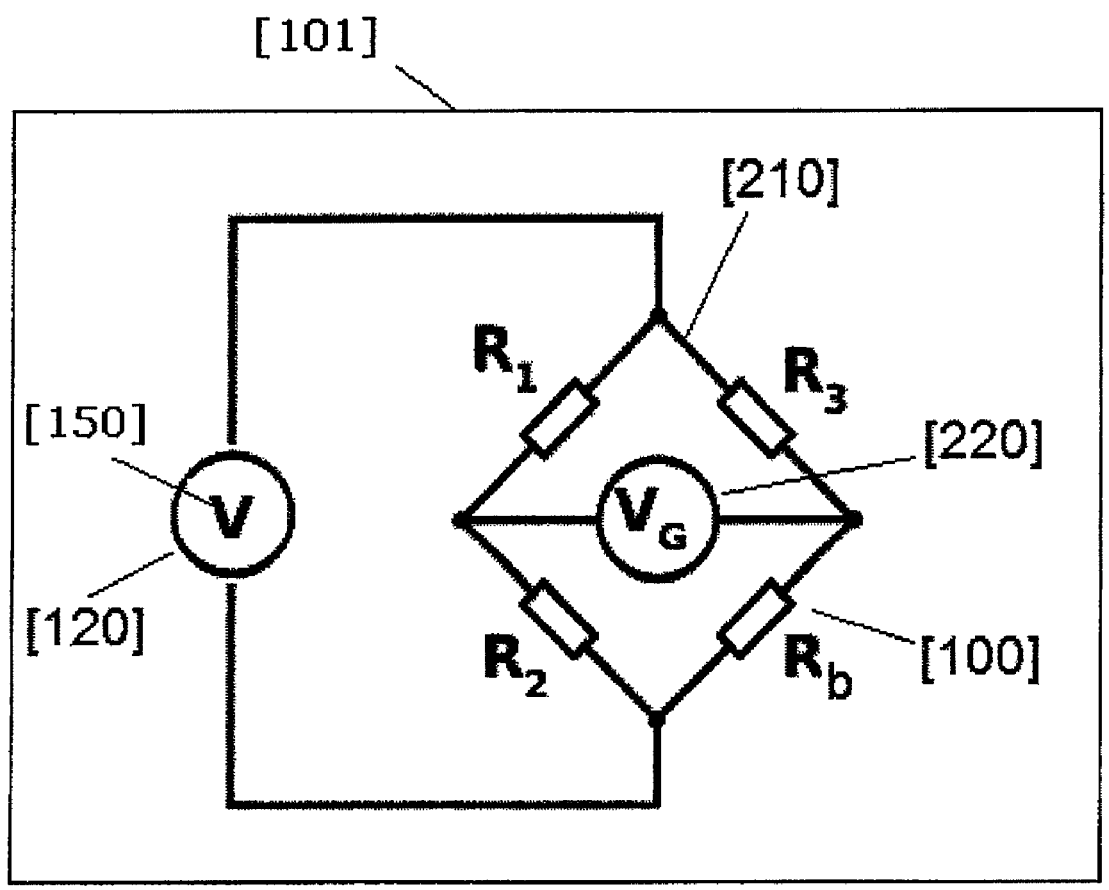
FIG. 4. shows another exemplary embodiment of the gas pressure sensor assembly.

Exemplary Embodiments of the Sensor Apparatus:

FIGS. 3 and 4 show the schematics for exemplary embodiments of the micro-thermistor gas pressure sensor assembly of the present invention. The micro-thermistor gas pressure sensor assembly comprises 1) at least one suspended platform micro-thermistor sensor device [100] fabricated on a substrate [300] and exposed to the gas pressure of a given atmospheric environment [400], and 2) a readout electrical circuit [101] connected to the said suspended platform micro-thermistor sensor device [100], wherein said suspended platform micro-thermistor sensor device acts as a variable electrical resistance in the said readout electrical circuit [101], and 3) a binary-wave voltage source [120] connected to the said suspended platform micro-thermistor sensor device [100], and 4) ohmmeter [140].

In this invention, the ohmmeter [140] is an electrical element that measures the micro-thermistor [100] electrical resistance. A more accurate type of ohmmeter has an electronic circuit that passes a current ($I_b$) through the micro-thermistor resistance, and another circuit that measures the voltage ($V_b$) across the micro-thermistor resistance. Since the current $I_b$ and voltage $V_b$ at the micro-thermistor are related to the driving voltage V [120] and to the readout electrical circuit architecture [101], the micro-thermistor electrical resistance can be measured by probing the driving voltage V and the voltage $V_L$ at some other load element (resistance, capacitance, or inductance) of the readout circuit. The readout electrical circuit [101] thus comprises at least one load resistance $R_L$ (or a load capacitance, or a load inductance) that can be used to determine the micro-thermistor electrical resistance, and thus function as the ohmmeter [140] of the readout electrical circuit [101]. The ohmmeter load resistance can be the micro-thermistor electrical resistance itself, or any other electrical elements of the readout circuit either a resistance, a capacitance, or an inductance, or a combination thereof. The ohmmeter [140] is therefore either a R, a RC, a RL, or a RCL analog or digital electronic circuit part of the readout circuit [101].

The readout electrical circuit [101] comprises at least one load resistance acting as an ohmmeter [140], and may comprise other electrical resistances, capacitances and inductances. The readout circuit may be integrated on the substrate [300] by CMOS fabrication process, or be external to the substrate and made of standard electronics components electrically connected to the suspended platform micro-thermistor [100]. The micro-thermistor suspended platform [100] is a variable electrical resistance in the readout circuit [101] and is exposed to the gas pressure of a given atmospheric environment [400]. The rest of the readout circuit [101] may or may not be exposed to the gas pressure of the environment [400]. It will be appreciated by those skilled in the art that the exemplary embodiments shown in this invention relate to very simple readout circuits, easily integrated onto small CMOS platforms. Thus, the readout circuit [101] surface area may be as small as 1 mm$^2$ or smaller.

FIG. 3 shows an exemplary readout circuit embodiment of the invention. The readout circuit [101] includes a voltage source [120] driving both a micro-thermistor device [100] and a load resistance [130]. The voltage source [120] provides a binary-wave voltage signal V [150] that can be adjusted in value and in amplitude ($V_1$, $V_2$, $\Delta V$). The voltage $V_L$ [160] at the load resistance [130] can be used to determine the resistance of the micro-thermistor [100], therefore the load resistance [130] acts as the ohmmeter [140] of the readout circuit [101]. The readout circuit [101] may be made of analog or digital electronics components or a combination of analog and digital electronics components. Given this circuit embodiment, the voltage $V_b$ at the micro-thermistor [100] and the voltage $V_L$ [160] at the load resistance [130] are given by the following transfer functions well known in the art:

$$V_b = VR_b/(R_L + R_b)$$

$$V_L = VR_L/(R_L + R_b)$$

The ohmic responsivity of the micro-thermistor device [100] can be determined using:

$$\Omega = dR_b/dP_b = (dR_b/dV_L)(dV_L/dV)(dV/dP_b) = (\Delta V_L/\Delta V)(R_L + R_b)^4/2V^2R_bR_L$$

Where V is the average voltage value of the voltage signal [150], $V = (V_1 + V_2)/2$, and $R_b$ is the average electrical resistance of the micro-thermistor [100], $R_b = (R_{b1} + R_{b2})/2$. The ohmic responsivity Ω of the micro-thermistor device can be measured from the ratio between the voltage change $\Delta V_L$ at the load resistance [130,140] and the amplitude $\Delta V$ of the binary-wave voltage source [120] of the readout circuit [101]. Therefore, the electrical response $\Delta V_L$ of the ohmmeter [130, 140] is proportional to the ohmic responsivity Ω of the micro-thermistor device [100], which is related to the gas pressure p inside the environment [400].

Cancellation of the temperature dependency of the thermal components [10], [20], [40], [50] and [80] can be achieved by keeping the voltages ($V_{L1}$, $V_{L2}$, $\Delta V_L$) at the load resistance always at the same predetermined values, while adjusting the binary-wave voltages ($V_1$, $V_2$, $\Delta V$) to obtain the said voltages at the load resistance. The predetermined values of ($V_{L1}$, $V_{L2}$, $\Delta V_L$) are such that the minimum voltage ($V_1$) of the binary-wave electrical excitation is adjusted so that the micro-thermistor resistance is at a predetermined value $R_{b1}$ (and the load voltage at a predetermined value $V_{L1}$) and the maximum voltage ($V_2$) of the binary-wave electrical excitation is adjusted so that the micro-thermistor resistance is at a predetermined value $R_{b2}$ (and the load voltage at a predetermined value $V_{L2}$), where the difference of electrical resistance, $dR_b = R_{b2} - R_{b1} = \alpha R_b dT_b$, corresponds to a difference of temperature for the micro-thermistor, $dT_b = T_{b2} - T_{b1}$, of a few degrees Kelvin. The difference $dR_b$ is thus a constant value and the measurements are done always at the same micro-thermistor temperatures and same $\Delta V_L$. The incremental amount of electrical heating power [30] applied to the micro-thermistor suspended platform [100] is $dP_b = V_{b2}^2/R_{b2} - V_{b1}^2/R_{b1}$, where $V_{b1}$ and $V_{b2}$ are the voltage values at the micro-thermistor [100] related to $V_1$ and $V_2$ by virtue of the abovementioned transfer function, and the ohmic responsivity is determined by the ratio $\Omega = dR_b/dP_b$. Since the ohmic responsivity Ω of the micro-thermistor device [100] is related to its thermal conductivity G and to gas pressure p, the measurement of ohmic responsivity provides a measurement of gas pressure within the environment [400]. And since the load resistance [130] acts as the ohmmeter [140], the load voltage is identical to the ohmmeter voltage, $V_{ohm} = V_L$, and the ohmmeter electrical voltages ($V_{ohm1} = V_{L1}$, $V_{ohm2} = V_{L2}$, $\Delta V_{ohm} = \Delta V_L$) are kept constant at predetermined values, and the measurements are done always at the same micro-thermistor temperatures in order to cancel the temperature dependencies of the thermal components [10], [20], [40] [50] and [80].

FIG. 4 shows another exemplary readout circuit embodiment of the invention. The readout circuit [101] includes a voltage source [120] driving both a micro-thermistor device [100] and a resistor bridge [210] comprising several resistors. The voltage source [120] provides a binary-wave voltage signal V [150] that can be adjusted in value and in amplitude ($V_1$, $V_2$, $\Delta V$). The voltage $V_G$ [220] at the bridge can be used to determine the resistance of the micro-thermistor [100], therefore the bridge voltage $V_G$ [220] acts as the ohmmeter [140] of the readout circuit [101]. The readout circuit [101] may be made of analog or digital electronics components or a combination of analog and digital electronics components. Given this circuit embodiment, the voltage $V_b$ at the micro-thermistor [100] and the voltage $V_G$ [220] at the bridge are given by the following transfer functions well known in the art:

$$V_b = VR_b/(R_3 + R_b)$$

$$V_G = V(R_b/(R_3 + R_b) - R_2/(R_1 + R_2))$$

The ohmic responsivity of the micro-thermistor device [100] can be determined using:

$$\Omega = dR_b/dP_b = (dR_b/dV_G)(dV_G/dV)(dV/dP_b) = (\Delta V_G/\Delta V)(R_L + R_b)^4/2V^2 R_b R_L$$

Where V is the average voltage value of the voltage signal [150], $V = (V_1 + V_2)/2$, and $R_b$ is the average electrical resistance of the micro-thermistor [100], $R_b = (R_{b1} + R_{b2})/2$. The ohmic responsivity Ω of the micro-thermistor device can be measured from the ratio between the voltage change $\Delta V_G$ at the bridge [220] and the amplitude $\Delta V$ of the binary-wave voltage source [120] of the readout circuit [101]. Therefore, the electrical response $\Delta V_G$ of the ohmmeter [220,140] is proportional to the ohmic responsivity Ω of the micro-thermistor device [100], which is related to the gas pressure p inside the environment [400].

Cancellation of the temperature dependency of the thermal components [10], [20], [40], [50] and [80] can be achieved by keeping the voltages ($V_{G1}$, $V_{G2}$, $\Delta V_G$) at the bridge always at the same predetermined values, while adjusting the binary-wave voltages ($V_1$, $V_2$, $\Delta V$) to obtain the said voltages at the bridge. The predetermined values of ($V_{G1}$, $V_{G2}$, $\Delta V_G$) are such that the minimum voltage ($V_1$) of the binary-wave electrical excitation is adjusted so that the micro-thermistor resistance is at a predetermined value $R_{b1}$ (and the bridge voltage at a predetermined value $V_{G1}$) and the maximum voltage ($V_2$) of the binary-wave electrical excitation is adjusted so that the micro-thermistor resistance is at a predetermined value $R_{b2}$ (and the bridge voltage at a predetermined value $V_{G2}$), where the difference of electrical resistance, $dR_b = R_{b2} - R_{b1} = \alpha R_b dT_b$, corresponds to a difference of temperature for the micro-thermistor, $dT_b = T_{b2} - T_{b1}$, of a few degrees Kelvin. The difference $dR_b$ is thus a constant value and the measurements are done always at the same micro-thermistor temperatures and same $\Delta V_G$. The incremental amount of electrical heating power [30] applied to the micro-thermistor suspended platform [100] is $dP_b = V_{b2}^2/R_{b2} - V_{b1}^2/R_{b1}$ where $V_{b1}$ and $V_{b2}$ are the voltage values at the micro-thermistor [100] related to $V_1$ and $V_2$ by virtue of the abovementioned transfer function, and the ohmic responsivity is determined by the ratio $\Omega = dR_b/dP_b$. Since the ohmic responsivity Ω of the micro-thermistor device [100] is related to its thermal conductivity G and to gas pressure p, the measurement of ohmic responsivity provides a measurement of gas pressure within the environment [400]. And since the bridge [220] acts as the ohmmeter [140], the bridge voltage is identical to the ohmmeter voltage, $V_{ohm} = V_G$, and the ohmmeter electrical voltages ($V_{ohm1} = V_{G1}$, $V_{ohm2} = V_{G2}$, $\Delta V_{ohm} = \Delta V_G$) are kept constant at predetermined values, and the measurements are done always at the same micro-thermistor temperatures in order to cancel the temperature dependencies of the thermal components [10], [20], [40], [50] and [80].

The invention is not limited to these specific readout circuit embodiments and may show different circuit architectures comprising electrical resistances, capacitances and inductances, connected in such a way as to generate different transfer functions with or without electrical gain, and to provide a measurement of the ohmic responsivity of the micro-thermistor suspended platform [100].

Since the ohmic responsivity of the micro-thermistor suspended platform [100] is related to gas pressure, the micro-thermistor gas pressure sensor assembly of the present invention becomes calibrated by measuring and specifying the parametric relation between the ohmic responsivity Ω of the micro-thermistor suspended platform [100] and the gas pressure p within the environment [400]. Equivalently, the micro-thermistor gas pressure sensor assembly of the present invention becomes calibrated by measuring and specifying the parametric relation between the ohmmeter electrical voltage difference $\Delta V_{ohm}$ and the gas pressure p within the environment [400].

The relation between $\Omega$ and p for the micro-thermistor gas pressure sensor are fundamentally linked to the relation between the thermal conductivity G of the micro-thermistor device and the gas pressure p.

$$\frac{\alpha R_b}{\Omega} = G_{leg} + G_{radiation} + G_{gas} + G_{conv} + \frac{dG}{dT_b}(T_b - T_s)$$

If the measurements are performed always at the same two micro-thermistor suspended platform temperatures $T_{b1}$ and $T_{b2}$, the relation becomes:

$$\frac{\alpha R_b}{\Omega} = G_{gas} + \text{constant} = \frac{\beta \cdot A}{\frac{ds}{\lambda_{gas_s}} + \frac{1}{\gamma_{gas} \cdot p}} + \frac{k \cdot \beta \cdot A}{\frac{de}{\lambda_{gas_e}} + \frac{1}{\gamma_{gas} \cdot p}} + \text{constant}$$

Assuming no temperature dependence, the variation of thermal conductivity G of the micro-thermistor device with pressure can be reduced to a 5-parameter polynomial relation that cancels the need for precise knowledge of the parameters ($\lambda_{gas}$, $\gamma_{gas}$, $\eta$, $T_s$, $T_{env}$, $\epsilon$, $d_s$, $d_e$, $\beta$, h) of the system. If a relation between ohmic responsivity $\Omega$ and gas pressure p is sought, then we obtain a relation where the ohmic responsivity $\Omega$ is commensurate with the gas pressure p:

$$\alpha R_b/\Omega = X1 + X2/(X3 + p^{-1}) + X5/(X4 + p^{-1}).$$

Where: $X1 = G_{leg} + G_{rad} + G_{conv} + dG/dT_b(T_b - T_s)$, $X2 = \gamma \beta A$, $X3 = \gamma d_s/\lambda$, $X4 = \gamma d_e/\lambda$ and $X5 = k\gamma \beta A$. Since the ohmic responsivity $\Omega$ is related to the experimentally measurable parameters of the micro-thermistor ($P_{b1}$, $P_{b2}$, $R_{b1}$, $R_{b2}$, $V_{b1}$, $V_{b2}$) and to the experimentally measurable parameters of the readout circuit ($R_L$, $V_{ohm}$, etc.), the 5-parameter polynomial relation can also relate to those measurable parameters. For example, if a relation between ohmmeter electrical voltage difference $\Delta V_{ohm}$ and gas pressure p is sought, then we obtain a relation where the ohmmeter electrical voltage $\Delta V_{ohm}$ is commensurate with the gas pressure p:

$$(\Delta V/\Delta V_{ohm}) 2\alpha V^2 R_b^2 R_L/(R_L + R_b)^4 = X1 + X2/(X3 + p^{-1}) + X5/(X4 + p^{-1}).$$

This relation is valid for the embodiments shown in FIGS. 3 and 4, and the left hand side of the relation may be different for other readout circuit architectures having different voltage transfer functions, and the relation between p and $\Omega V_{ohm}$ can be reduced and normalized to a 5-parameter polynomial relation.

Therefore, calibrating the micro-thermistor gas pressure sensor made of a micro-thermistor device [100] and readout circuit [101] requires at least 5 different parameters, because the mathematical relation between gas pressure and ohmic responsivity comprises at least 5 different parameters; X1, X2, X3, X4 and X5. These parameters can be measured by performing 5 thermal conductivity measurements (or 5 ohmic responsivity measurements) at 5 different pressures, from which the parameters can be determined using standard fitting routines. These parameters depend on several factors such as temperature, gas composition and micro-thermistor physical characteristics, as listed in the table below. Therefore, whenever the parametric relation of a single sensor is extended to other sensors, several assumptions are implicitly made as described in Table 1. If the assumptions are valid, a same 5-parameter polynomial relation can be applied to a plurality of micro-thermistor gas pressure sensors of the same physical characteristics. Therefore, if the assumptions are valid, the same ohmic responsivity applies to a plurality of suspended platform micro-thermistor gas pressure sensors of the same physical characteristics.

TABLE 1

Parameters of the abovementioned 5-parameter polynomial relation.

| Parameter | Form | Dependencies |
|---|---|---|
| X1 | $X1 = G_{leg} + G_{rad} + G_{conv} + dG/dT_b (T_b - T_s)$ | Micro-thermistor temperature, substrate temperature, environment temperature, packaging environment, leg conduction, micro-thermistor emissivity, micro-thermistor surface area. |
| X2 | $X2 = \gamma \beta A$ | Gas composition, micro-thermistor surface area. |
| X3 | $X3 = \gamma d_s/\lambda$ | Gas composition, substrate temperature, micro-thermistor distance to substrate. |
| X4 | $X4 = \gamma d_e/\lambda$ | Gas composition, environment temperature, micro-thermistor distance to environment, packaging environment. |
| X5 | $X5 = k\gamma \beta A$ | Gas composition, micro-thermistor surface area, environment temperature, substrate temperature. |

In the present invention, the method for gas pressure measurement thus consists in electrically exciting a suspended platform micro-thermistor sensor device [100] with a binary-wave voltage source signal [120], and 2) measuring the ohmic responsivity of the said suspended platform micro-thermistor sensor device using an ohmmeter, wherein said ohmmeter has an electrical response proportional to said ohmic responsivity, and 3) determining gas pressure p from said ohmic responsivity $\Omega$, wherein the ohmic responsivity is related to the micro-thermistor thermal conductivity and to gas pressure. Gas pressure p is determined by the abovementioned 5-parameter polynomial relation relating pressure p with ohmic responsivity $\Omega$. Equivalently, gas pressure p is determined by the abovementioned 5-parameter polynomial relation relating pressure p with the ohmmeter electrical voltage difference $\Delta V_{ohm}$.

The above-mentioned 5-parameter polynomial relation is valid under the assumption of no temperature dependence. However, the temperatures inside the environment may vary with time due to thermal fluctuations, creating undesirable effects on the sensor calibration as most of the parameters of the parametric relation depend on temperature because they involve $G_{rad} = G_{rad}(T_b, T_s, T_{env})$ and $G_{gas} = G_{gas}(T_b, T_s, T_{env})$.

Figure 5:
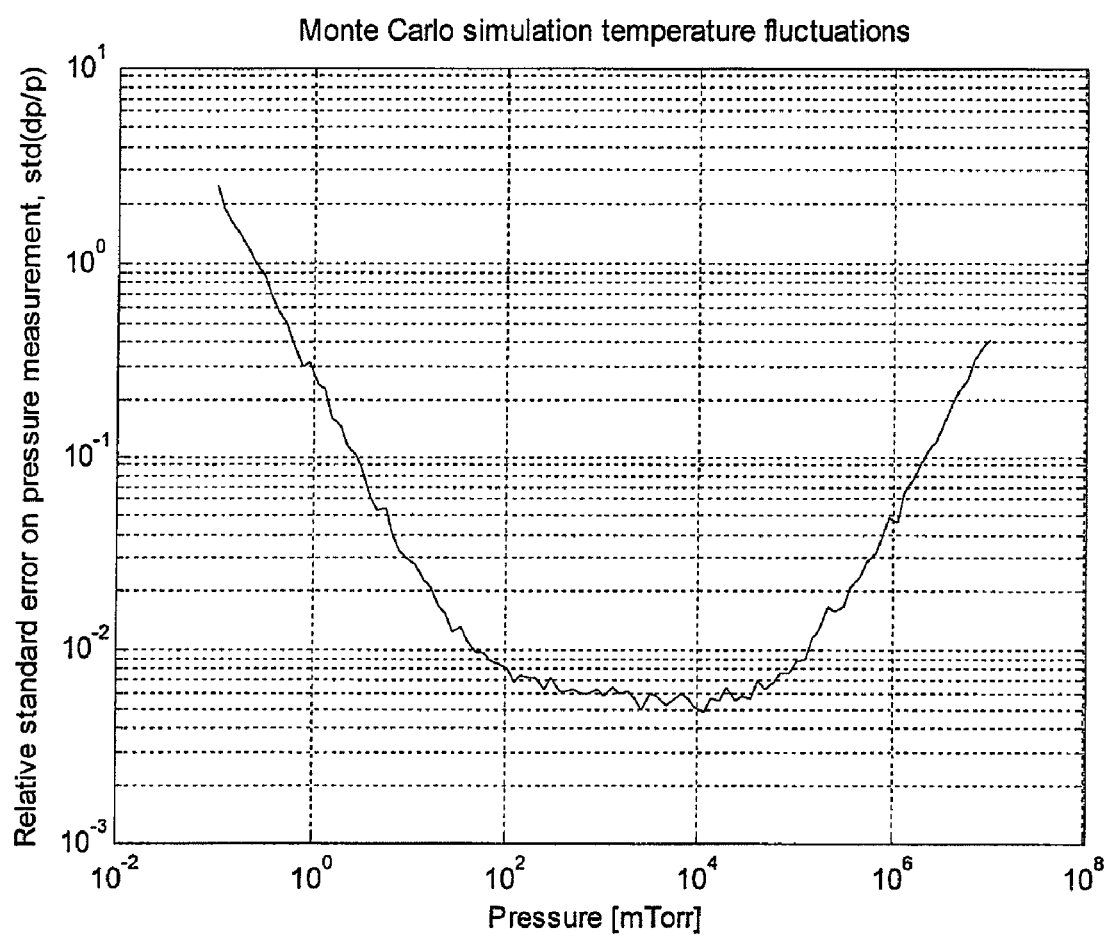
FIG. 5. shows a graph of the effect of temperature fluctuations of $(T_b, T_s, T_{env})$ on the micro-thermistor gas pressure sensor and deviations from an ideal 5-parameter calibration equation determined by MonteCarlo simulation. The plot shows the statistical error (1σ) on pressure measurement under a temperature fluctuation of 1K (1σ) for $T_b$ and 10K (1σ) for $(T_s, T_{env})$, for a 70×70 μm² micro-thermistor gas pressure sensor.

The effects of a variation of ($T_b, T_s, T_{env}$) and the deviations from an ideal 5-parameter parametric relation can be determined by MonteCarlo simulation as plotted in FIG. 5. The plot shows the 1$\sigma$ statistical error on the pressure measurement under a temperature fluctuation of 1K (1$\sigma$) for $T_b$ and 10K (1$\sigma$) for ($T_s, T_{env}$). This statistical error on the pressure measurement is with respect to a calibration done with a 5-parameter parametric relation under non-fluctuating temperatures. The relative errors on pressure measurements are typically below 10% between $10^{-2}$ Torr to $10^3$ Torr of air pressure. Therefore, the micro-thermistor gas pressure sensor of the present invention provides gas pressure sensing capability with good immunity to temperature fluctuations over a wide dynamic range. Further immunity to temperature fluctuations may be obtained by coupling thermally the substrate [300] of the gas pressure sensor assembly with a temperature controller, such as a thermoelectric cooling device.

While this invention has been particularly shown and described with references to preferred embodiments thereof, it will be understood by those skilled in the art that various changes in form and details may be made therein without departing from the scope of the invention encompassed by the appended claims.

What is claimed is:

1. A gas pressure sensor assembly comprising:
   at least one suspended platform micro-thermistor sensor device exposed to the gas pressure of a given atmospheric environment, said sensor device being at least partially encased in a gas pressure environment, said sensor device having a thermal conductivity that changes in response to a change in gas pressure;
   an electrical readout circuit connected to each of said at least one suspended platform micro-thermistor sensor device, wherein said suspended platform micro-thermistor sensor device acts as a variable electrical resistor in said electrical readout circuit;
   a binary-wave voltage source connected to said suspended platform micro-thermistor sensor device; and
   an ohmmeter.

2. A gas pressure sensor assembly of claim 1 wherein said suspended platform micro-thermistor sensor device has a physical dimension between 0.1 µm and 250 µm.

3. A gas pressure sensor assembly of claim 1 wherein said suspended platform micro-thermistor sensor device comprises a thermally-sensitive thin film made of a material having a Temperature Coefficient of Resistance (TCR) of at least 0.5% per degree Kelvin.

4. A gas pressure sensor assembly of claim 1 wherein said suspended platform micro-thermistor sensor device comprises a thermally-sensitive thin film made of vanadium oxide.

5. A gas pressure sensor assembly of claim 1 wherein said suspended platform micro-thermistor sensor device comprises a thermally-sensitive thin film made of amorphous silicon.

6. A gas pressure sensor assembly of claim 1 wherein the electrical readout circuit is a CMOS device.

7. A gas pressure sensor assembly of claim 1 wherein the electrical readout circuit comprises at least one load resistor.

8. A gas pressure sensor assembly of claim 1 wherein the electrical readout circuit comprises electrical resistors, capacitors and inductors.

9. A gas pressure sensor assembly of claim 1 wherein said electrical readout circuit is connected to a plurality of said at least one suspended platform micro-thermistor sensor devices.

10. A gas pressure sensor assembly of claim 1 wherein said binary-wave voltage source has a frequency below 100 Hertz.

11. A gas pressure sensor assembly of claim 1 wherein said ohmmeter is a RC, or RL, or RLC electronic circuit.

12. A method for gas pressure measurement comprising:
    electrically exciting a suspended platform micro-thermistor sensor device with a binary-wave voltage source signal having a frequency lower than 100 Hertz to allow reaching a steady-state thermal regime during each half-cycle of said voltage source signal;
    measuring the ohmic responsivity of said suspended platform micro-thermistor sensor device using an ohmmeter, wherein said ohmmeter has an electrical response proportional to said ohmic responsivity; and
    determining gas pressure from said ohmic responsivity.

13. The method for gas pressure measurement of claim 12 wherein said measuring of the ohmic responsivity applies to a plurality of suspended platform micro-thermistor sensor devices having the same physical characteristics.

14. The method for gas pressure measurement of claim 12 wherein the mathematical relation between said gas pressure and said ohmic responsivity comprises at least 5 parameters.

15. The method for gas pressure measurement of claim 12 wherein said binary-wave voltage source induces an incremental change of temperature of said suspended platform micro-thermistor, from temperature A to temperature B.

16. The method for gas pressure measurement of claim 15 wherein said temperature A and temperature B of said suspended platform micro-thermistor are kept constant.

* * * * *